US010166957B2

(12) United States Patent
Bach et al.

(10) Patent No.: US 10,166,957 B2
(45) Date of Patent: Jan. 1, 2019

(54) HYDRAULIC BRAKING SYSTEM FOR A LAND CRAFT

(75) Inventors: Thomas Bach, Wolken (DE); Harald Thelen, Oberfell (DE); Josef Knechtges, Mayen (DE); Bernd Schmitt, Neuwied (DE); Christian Chemnitz, Neuwied (DE)

(73) Assignee: Lucas Automotive GmbH, Koblenz (DE)

( * ) Notice: Subject to any disclaimer, the term of this patent is extended or adjusted under 35 U.S.C. 154(b) by 656 days.

(21) Appl. No.: 11/921,609

(22) PCT Filed: Jun. 8, 2006

(86) PCT No.: PCT/EP2006/005492
§ 371 (c)(1),
(2), (4) Date: Jul. 22, 2008

(87) PCT Pub. No.: WO2006/131367
PCT Pub. Date: Dec. 14, 2006

(65) Prior Publication Data
US 2008/0290725 A1 Nov. 27, 2008

(30) Foreign Application Priority Data
Jun. 9, 2005 (DE) .................. 10 2005 026 735

(51) Int. Cl.
*B60T 13/68* (2006.01)
*B60T 8/1766* (2006.01)
*B60T 8/175* (2006.01)
*B60T 8/36* (2006.01)
*B60T 8/40* (2006.01)
*B60T 8/48* (2006.01)

(52) U.S. Cl.
CPC ............ *B60T 8/1766* (2013.01); *B60T 8/175* (2013.01); *B60T 8/36* (2013.01); *B60T 8/404* (2013.01); *B60T 8/4872* (2013.01)

(58) Field of Classification Search
CPC .......... B60T 8/175; B60T 8/1766; B60T 8/36; B60T 8/404; B60T 8/4872
USPC .......................................... 303/116.1, 119.1
See application file for complete search history.

(56) References Cited

U.S. PATENT DOCUMENTS 4,969,696 A * 11/1990 Yogo et al. ................... 303/156
5,004,299 A * 4/1991 Brearley et al. ................ 303/15
(Continued)

FOREIGN PATENT DOCUMENTS

EP         0 965 509 A2    12/1999
WO     WO 03/018379 A1     3/2003

*Primary Examiner* — Xuan Lan Nguyen
(74) *Attorney, Agent, or Firm* — MacMillan, Sobanski & Todd, LLC (57) ABSTRACT

A hydraulic brake system for a land vehicle including a hydraulic connection between a master cylinder and wheel brakes that is established or blocked by valve arrangements in dependence upon trigger signals from an electronic control with the electronic control unit devised and programmed in such a way that, in order to set a brake pressure characteristic required for a specific vehicle behavior, the electronic control unit supplies trigger signals through which the setting of a respective brake pressure characteristic in two brake circuits in predefined pressure stages (delta-p) is staggered in terms of time by a substantially predefined time stage (delta-t).

20 Claims, 4 Drawing Sheets

(56) References Cited

U.S. PATENT DOCUMENTS

| | | | |
|---|---|---|---|
| 5,277,485 A * | 1/1994 | Broome | 303/119.1 |
| 5,727,852 A * | 3/1998 | Pueschel et al. | 303/113.4 |
| 6,116,702 A * | 9/2000 | Maehara | 303/116.1 |
| 2002/0067073 A1* | 6/2002 | Gegalski et al. | 303/119.1 |
| 2004/0075338 A1 | 4/2004 | Schmitt et al. | |
| 2006/0152075 A1* | 7/2006 | Goebels et al. | 303/119.1 |

* cited by examiner

HYDRAULIC BRAKING SYSTEM FOR A LAND CRAFT

CROSS-REFERENCE TO RELATED APPLICATIONS

This application is a National stage of International Application No. PCT/EP2006/005492 filed Jun. 8, 2006, the disclosures of which are incorporated herein by reference, and which claimed priority to German Patent Application No. 10 2005 026 735.1 filed Jun. 9, 2005, the disclosures of which are incorporated herein by reference.

BACKGROUND OF THE INVENTION

The present invention relates to a hydraulic brake system for a land vehicle having a master cylinder, which is actuable by the driver by means of a pedal directly or via a brake booster disposed downstream of the pedal, for generating brake pressure in two brake circuits, each of which comprises two wheel brakes. In this case, a hydraulic connection between the master cylinder and the wheel brakes is to be established or blocked by means of valve arrangements in dependence upon trigger signals from an electronic control unit in order that normal braking operations brought about directly by the driver or braking operations influenced by the electronic control unit may be carried out in dependence upon measured quantities, which are supplied to the electronic control unit and reflect the vehicle behaviour and/or the driver request, by varying the brake pressure characteristic in the wheel brakes by activating the valve arrangements associated therewith.

Such hydraulic brake systems are able and intended to carry out automatic braking operations. By these are meant braking operations that occur as a rule independently of a force introduced by the driver at the pedal. Examples of these are braking operations for acceleration spin regulation (ASR), which prevents individual wheels from spinning during the starting operation by targeted braking of the corresponding wheels, braking operations for an electronic stability program (ESP), which adapts the vehicle behaviour in extreme ranges to the driver request and the road conditions by targeted braking of individual wheels, or braking operations for adaptive cruise control (ACC), in which i.a. by automatic braking a defined distance of the actual vehicle from a vehicle travelling in front is maintained.

Such automatic braking operations, which, caused by corresponding input variables (wheel speeds and/or vehicle speed, or the like) have to run off at low brake pressure level, are particularly susceptible to a jerking and/or pulling of the vehicle that is perceptible by the driver. This is the case for example during ACC braking interventions. These situations make it necessary for almost the same brake pressure levels to prevail in both brake circuits I, II during the braking operation in order to prevent such a jerking and/or pulling of the vehicle from occurring.

The underlying problem of the invention is that during automatic braking operations the two brake circuits are hydraulically uncoupled from one another, with the result that a pressure equalization between them cannot occur.

BRIEF SUMMARY OF THE INVENTION

The solution according to the invention therefore provides that the electronic control unit is devised and programmed in such a way that, in order to set a brake pressure characteristic required for a specific vehicle behaviour, it supplies trigger signals, by means of which the setting of a respective brake pressure characteristic in the two brake circuits in predefined pressure stages is staggered in terms of time by a substantially predefined time stage.

This achieves the surprising effect that the smallest reproducibly adjustable pressure stage in the total brake pressure characteristic is smaller than if the pressure characteristic were varied synchronously for both brake circuits. Thus, slight braking interventions are more finely apportionable and any asymmetries are not so immediately detectable by the driver. It is therefore possible to at least partially compensate the fact that the two brake circuits are not hydraulically coupled during automatic braking operations.

Preferably a pump, which is actuable by the electronic control unit by means of a trigger signal, is provided for raising or lowering the brake pressure in the wheel brakes and may vary its delivery rate in dependence upon the trigger signal.

An electric motor may further be provided, which actuates the pumps of both brake circuits simultaneously.

In one embodiment, the electronic control unit is devised and programmed in such a way that, in order to set a brake pressure characteristic, it supplies trigger signals, by means of which starting from an initial value at a point of time in one of the brake circuits the brake pressure rises by a pressure stage to a value and after attainment thereof this brake pressure remains substantially constant for the duration of a pressure stage up to a point of time.

In this case, the electronic control unit may further be devised and programmed in such a way that, in order to set a brake pressure characteristic, it supplies trigger signals, by means of which in parallel to the raising of the brake pressure in the one brake circuit by a pressure stage to a value, in the other brake circuit the brake pressure from the point of time remains substantially constant at the initial value for the duration of the time stage, and the brake pressure in the second brake circuit at a point of time rises by a pressure stage to a value, which has been achieved at the point of time.

Furthermore, in the present case the electronic control unit may be devised and programmed in such a way that the alternating pressure increase and pressure keeping phases between the two brake circuits continues from the point of time.

In a further embodiment, the electronic control unit is devised and programmed in such a way that, in order to set a brake pressure characteristic, it supplies trigger signals, by means of which starting from an initial value at a point of time in one of the brake circuits the brake pressure drops by a pressure stage to a value and after attainment thereof this brake pressure remains substantially constant for the duration of a time stage up to a point of time.

In this case, the electronic control unit may be devised and programmed in such a way that, in order to set a brake pressure characteristic, it supplies trigger signals, by means of which in parallel to the dropping of the brake pressure in the one brake circuit by a pressure stage to a value, in the other brake circuit the brake circuit from the point of time remains substantially constant at the initial value for the duration of the time stage, the brake pressure in the other circuit at the point of time drops by a pressure stage to a value, which has been attained at the point of time.

Furthermore, the electronic control unit in this case may be devised and programmed in such a way that the alternating pressure reduction and pressure keeping phases between the two brake circuits continue from the point of time.

In a further embodiment, the electronic control unit is devised and programmed in such a way that, in order to set a brake pressure characteristic, it supplies trigger signals, by means of which starting from an initial value at a point of time in one of the brake circuits the brake pressure rises by a preliminary pressure stage to a value, which has been attained at a point of time, and after attainment thereof this brake pressure remains substantially constant for the duration of a time stage up to a point of time.

In this case, the time stage may be a multiple of, preferably two-times, the preliminary time stage.

Furthermore, in this case the electronic control unit may be devised and programmed in such a way that, in order to set a brake pressure characteristic, it supplies trigger signals, by means of which at the point of time in the one brake circuit the brake pressure up to a point of time rises by a pressure stage to a value, wherein the difference of the points of time corresponds substantially to the time stage and the pressure stage substantially corresponds to a multiple of, preferably two times, the preliminary pressure stage.

In a development of the last-described embodiment, the electronic control unit is devised and programmed in such a way that, in order to set a brake pressure characteristic, it supplies trigger signals, by means of which in parallel to the increasing of the brake pressure in the one circuit by the preliminary pressure stage to a value and the keeping of said pressure for the duration of a time stage up to the point of time, the brake pressure in the other circuit from the point of time remains substantially constant at the initial value for the duration of the preliminary time stage, rises at the point of time by the pressure stage to the value, which has been attained at the point of time, wherein the difference of the points of time corresponds to the duration of the time stage, and from the point of time the brake pressure in the second brake circuit remains substantially constant for the duration of the time stage up to the point of time.

It is further provided that the electronic control unit is devised and programmed in such a way that the alternating pressure build-up and pressure keeping phases between the two brake circuits continue from the point of time.

In a further embodiment, the electronic control unit is devised and programmed in such a way that, in order to set a brake pressure characteristic, it supplies trigger signals, by means of which starting from an initial value at a point of time in the one brake circuit the brake pressure drops by a preliminary pressure stage to a value, which has been attained at a point of time, and after attainment thereof this brake pressure remains substantially constant for the duration of a time stage up to a point of time.

Here too, the time stage may last a multiple of, preferably two times the preliminary time stage.

The electronic control unit may further be devised and programmed in such a way that, in order to set a brake pressure characteristic, it supplies trigger signals, by means of which at the point of time in the one brake circuit the brake pressure up to a point of time drops by a pressure stage to a value, wherein the difference of the points of time corresponds substantially to the time stage and the pressure stage corresponds substantially to a multiple of, preferably two times, the preliminary pressure stage.

In the last-described embodiment, it is further possible for the electronic control unit to be devised and programmed in such a way that, in order to set a brake pressure characteristic, it supplies trigger signals, by means of which in parallel to the dropping of the brake pressure in the one brake circuit by the preliminary pressure stage to a value and the keeping of said pressure for the duration of a time stage up to a point of time, the brake pressure in the other brake circuit from the point of time remains substantially constant at the initial value for the duration of the preliminary time stage, at the point of time drops by the pressure stage to the value, which has been attained at the point of time, wherein the difference of the points of time corresponds to the duration of the time stage, and from the point of time the brake pressure in the other brake circuit remains substantially constant for the duration of the time stage up to the point of time.

The electronic control unit may further be devised and programmed in such a way that the alternating pressure reduction and pressure keeping phases between the two brake circuits continue from the point of time.

Other advantages of this invention will become apparent to those skilled in the art from the following detailed description of the preferred embodiments, when read in light of the accompanying drawings.

DETAILED DESCRIPTION OF THE INVENTION

Figure 1:
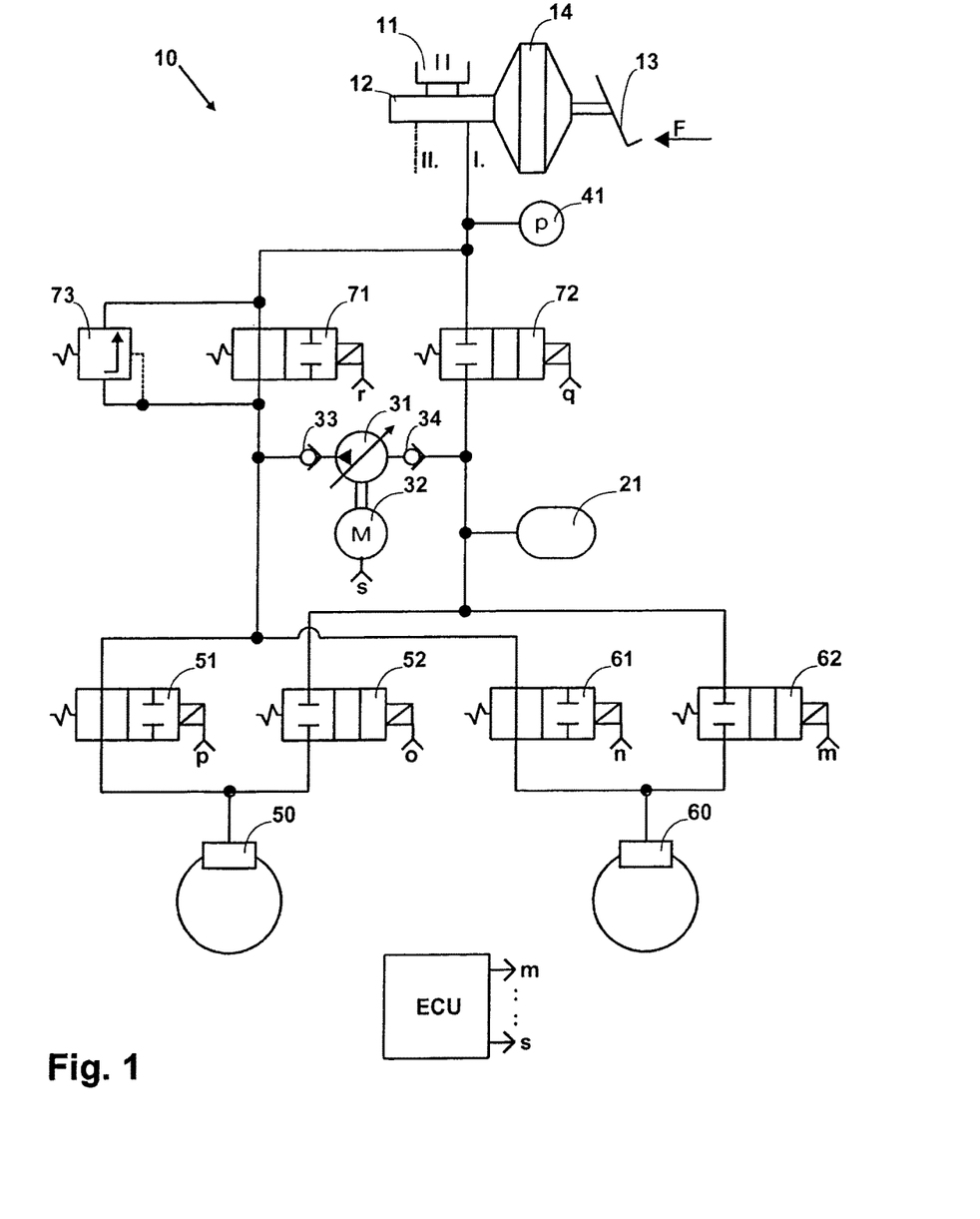
In FIG. 1 the hydraulic circuit diagram of an electronically controllable brake system is diagrammatically represented.

The brake system 10 operates by means of hydraulic fluid that is stored in part in a tank 11, which is connected as a reservoir to the master (brake) cylinder 12. To generate brake pressure, which arises by pressurizing the hydraulic fluid, a master cylinder 12 is used, which may be actuated by the driver by means of a pedal 13, wherein the force F introduced by the driver is boosted—preferably pneumatically or hydraulically—by means of a brake booster 14 that is disposed between the pedal 13 and the master cylinder 12.

From the master cylinder 12 a first and second brake circuit I, II are supplied with hydraulic fluid. The brake circuits I, II are of a substantially identical construction and each have two wheel brakes 50, 60. For this reason, only the first brake circuit I that supplies the two wheel brakes 50 and 60 is represented in detail here. Depending on which wheel brakes of the vehicle are supplied from which brake circuit, the result is a front axle/rear axle split, i.e. the one brake circuit supplies the wheel brakes of the front axle and the other brake circuit supplies the wheel brakes of the rear axle, or a diagonal split, i.e. each brake circuit supplies the wheel brake of a front wheel and the wheel brake of the diagonally opposite rear wheel.

Between the master cylinder 12 and the wheel brakes 50 and 60 there is a hydraulic connection. This hydraulic connection is determined by 2/2-way valves 51, 52, 61, 62, 71 and 72, which are actuated by electromagnets and in the non-actuated, i.e. electrically non-activated state adopt the illustrated basic positions. In their basic position the 2/2-way valves 51, 61 and 71 are situated each in their flow position and the 2/2-way valves 52, 62 and 72 each in their blocked position.

To implement normal braking operations, in the illustrated basic position of the 2/2-way valves 51, 52, 61, 62, 71 and 72 there is a direct hydraulic connection between the master cylinder 12 and the wheel brakes 50 and 60. In this case, when the master cylinder 12 is actuated, in the wheel brakes 50 and 60 a brake pressure is effective, the amount of which is dependent upon the force F introduced by the driver into the pedal 13 and upon the boost characteristic of the brake booster 14.

The brake system according to the invention is devised so as to implement anti-lock control (ABS) in order to prevent locking of the wheels during a braking operation. For this purpose, individual modulation of the effective brake pressure in the wheel brakes 50 and/or 60 is necessary. This occurs by setting in a time sequence alternating pressure build-up, pressure keeping and pressure reduction phases as described in detail further below, which arise in that the 2/2-way valves 51, 52 and 61, 62 associated with the wheel brakes 50 and 60 respectively are suitably activated by means of an electronic control unit ECU. This electronic control unit ECU, besides a row of signal inputs that may be supplied i.a. by wheel speed sensors, yaw rate sensors and/or transverse acceleration sensors etc., has trigger outputs for trigger signals m, n, . . . , s for the electrical activation of the 2/2-way valves 51, 52, 61, 62, 71 and 72 as well as of the electric motor 32 of a pump 31. The activating operations occur in dependence, on the one hand, upon measured variables describing the vehicle behaviour (for example wheel speeds, yaw rate, transverse acceleration) and, on the other hand, upon measured variables describing the driver request (for example actuation of the pedal 13, steering wheel angle). As a measured variable describing the driver request it is also possible to use the brake pressure p that is generated in the master cylinder 12 and then acquired by means of a sensor 41 and supplied as a signal input to the ECU.

During a pressure build-up phase the 2/2-way valves 51, 52 and 61, 62 each adopt their basic position, so that owing to an actuation of the pump 31 brought about by the electronic control unit ECU by means of a trigger signal s an increase of the brake pressure in the wheel brakes 50 and/or 60 is effected as in a normal braking operation.

For a pressure keeping phase, only the 2/2-way valves 51 and 61 are activated by means of trigger signals p, n and transferred in this case into the respective blocked positions. The 2/2-way valves 52 and 62 are not activated in the pressure keeping phase and therefore remain in their blocked position. Consequently, the wheel brakes 50 and 60 are hydraulically uncoupled from the rest of the brake circuit, with the result that brake pressure in the wheel brakes 50 and 60 is held constant and cannot escape.

During a pressure reduction phase, both the 2/2-way valves 51, 61 and the 2/2-way valves 52, 62 are activated by means of trigger signals p, n; m, o. During the pressure reduction phase the 2/2-way valves 51 and 61 are transferred into their respective blocked position and the 2/2-way valves 52 and 62 into their respective flow positions. Thus, hydraulic fluid is able to flow out of the wheel brake 50 and/or 60 in order to lower a brake pressure in the wheel brakes 50 and/or 60.

The hydraulic fluid, which during a pressure reduction phase flows out of the wheel brakes 50 and 60 through the 2/2-way valves 52 and 62 respectively, is fed back into the brake circuit I by means of a pump 31, which is actuated by means of an electric motor 31 (activated by a trigger signal s), wherein a low-pressure receiver 21 is used for the temporary storage of hydraulic fluid.

The pump 31 designed for example as a radial piston pump is designed to block counter to its feed direction by means of a non-return valve 33 at the output of the pump 31 and a non-return valve 34 at the input of the pump 31.

The rotational speed of the electric motor 32 is adjustable and/or controllable by means of the trigger signal s of the ECU. The delivery rate of the pump 31 may therefore be varied. It is also possible for the electric motor 32 simultaneously to actuate the corresponding pump of the second brake circuit II, which is not represented in detail here.

Automatic braking operations occur as a rule independently of a force F introduced by the driver at the pedal 13. Such automatic braking operations occur for example in acceleration spin regulation (ASR), which prevents individual wheels from spinning during a starting operation by targeted braking, or in an electronic stability program (ESP), which adapts the vehicle behaviour to the request of the driver and the road conditions in extreme ranges through targeted braking of individual wheels, or in adaptive cruise control (ACC), whereby by means of i.a. automatic braking a distance of the actual vehicle from a vehicle travelling in front is maintained.

To implement automatic braking operations, the 2/2-way valves 71 and 72 are activated so that the 2/2-way valve 71 adopts its blocked position and the 2/2-way valve 72 adopts its flow position. This means that, on the one hand, the output of the pump 31 is hydraulically uncoupled from the brake circuit II and/or the master cylinder 12, i.e. a direct hydraulic connection exists only between the output of the pump 31 and the wheel brakes 50 and 60. On the other hand, a hydraulic connection of the input of the pump 31 to the master cylinder 12 and/or the tank 11 exists, thereby allowing the pump 31 to take in hydraulic fluid from the tank 11 in order to generate brake pressure in the wheel brakes 50 and 60. A fine adjustment and/or modulation of the brake pressure may be effected by corresponding activation of the 2/2-way valves 51, 52 and 61, 62 associated with the wheel brakes 50 and 60 respectively, as explained in connection with ABS.

Connected in parallel to the 2/2-way valve 71 is a pressure relief valve 73. This prevents the brake pressure, which that is generated at the output of the pump 31 when the 2/2-way valve is in blocked position, from exceeding a predetermined dimension. This measure prevents damage to the brake system.

During automatic braking operations that have to run off at low brake pressure level, the driver very easily perceives a jerking and/or pulling of the vehicle. This is because in such brake systems during automatic braking operations in both brake circuit I, II the output of the pump 31 is hydraulically uncoupled from the master cylinder 12 on account of the 2/2-way valve 71 being switched into blocked position. The brake circuits I, II are therefore hydraulically separate from one another and so a pressure equalization in the master cylinder 12 according to the floating piston principle, such as is otherwise the case in conventional brake systems, is not provided.

Figure 2:
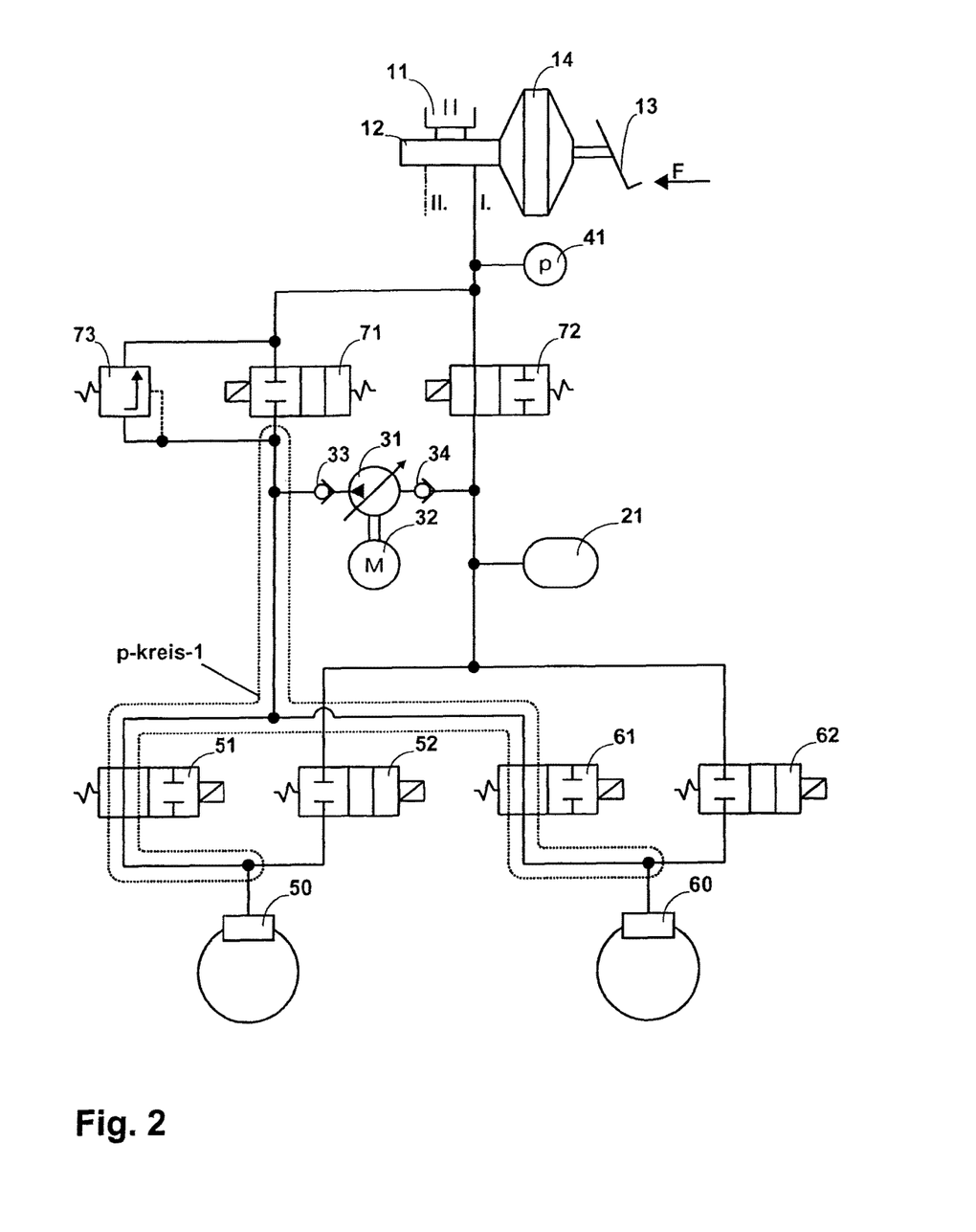
FIG. 2 shows the hydraulic circuit diagram of the brake system of FIG. 1, in which because of specific position combinations the brake circuits are hydraulically separate from one another, so that a pressure equalization between them by means of the master cylinder is not provided.

This situation is represented in FIG. 2, wherein the 2/2-way valve 72 is switched into flow position to allow the pump 31 to take in hydraulic fluid from the tank 11 in order to generate a brake pressure p-circuit-1 in the wheel brakes 50 and 60 of the first brake circuit I.

According to the invention, it is then proposed that the setting of a brake pressure characteristic p-total that is required for a specific vehicle behaviour, particularly in terms of deceleration or acceleration, is effected in that in each of the brake circuits I, II the setting of a brake pressure characteristic p-circuit-1, p-circuit-2 is effected in predefined pressure stages delta-p in terms of time in such a way that the brake pressure characteristics p-circuit-1, p-circuit-2 occur staggered by a predefined time stage delta-t.

Figure 3:
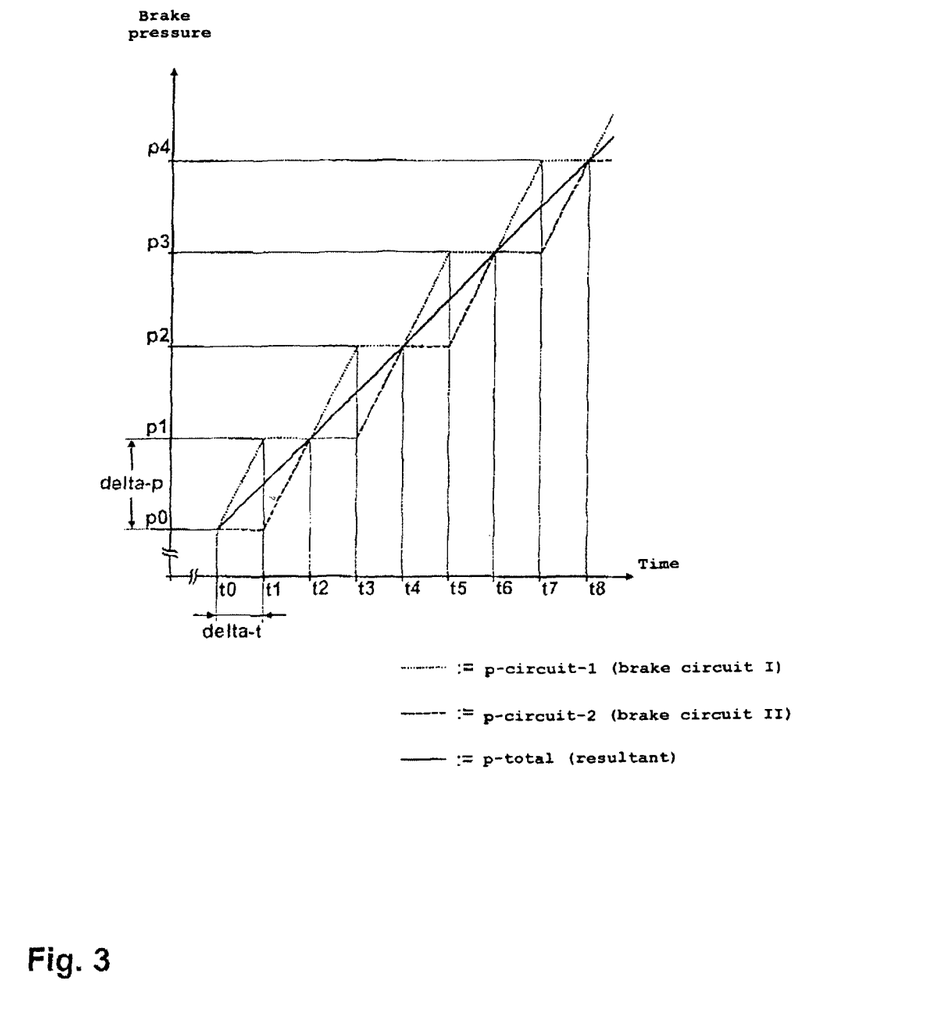
FIG. 3 illustrates a first pressure characteristic that arises when in the two brake circuits the setting of the respective brake pressure characteristics occurs in predefined pressure stages staggered in terms of time.

FIG. 3 illustrates a first procedure for this purpose. Starting from an initial value p0, at a point of time t0 in the first brake circuit I the brake pressure p-circuit-1 is raised by a pressure stage delta-p to a value p1. As soon as the brake pressure p-circuit-1 has reached the value p1 at the point of time t1, it is held constant up to a point of time t2 for the duration of a time stage delta-t that corresponds to the difference of the points of time t1, t0.

In parallel thereto, in the second brake circuit II the brake pressure p-circuit-2 from the point of time t0 is held constant at the initial value p0 for the duration of the time stage delta-t until the point of time t1 is reached. The brake pressure in the second brake circuit II is then raised by the pressure stage delta-p to the valve p1. As soon as the brake pressure p-circuit-1 has reached the value p1 at the point of time t2, it is held constant up to a point of time t3 for the duration of a time stage delta-t that again corresponds to the difference of the points of time t1, t0.

If this interaction between the brake circuits I, II is continued from the points of time t2 and t3, respectively, this leads in the brake circuits I, II to the brake pressure characteristics p-circuit-1, p-circuit-2 represented in FIG. 3. From these results the brake pressure characteristic p-total, which is decisive for the vehicle behaviour and for which an, in principle, linear shape arises.

Figure 4:
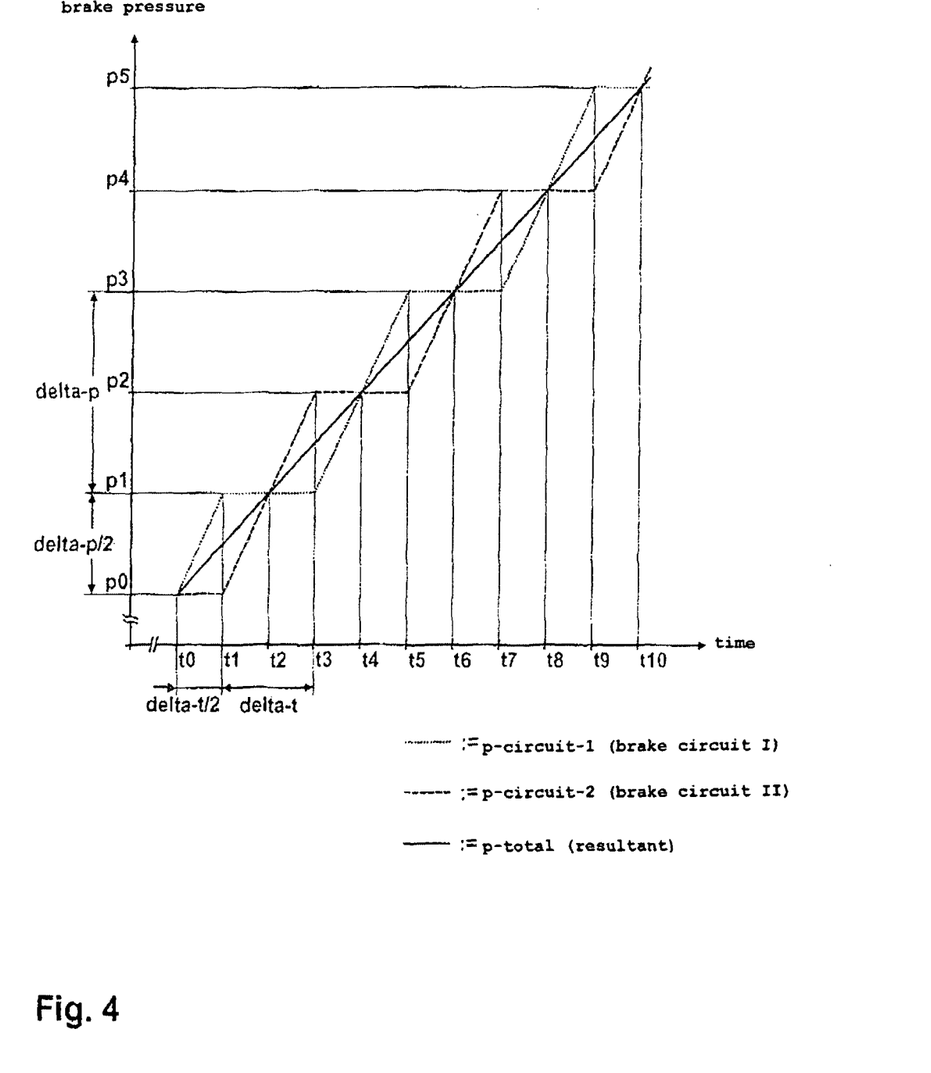
FIG. 4 illustrates a first pressure characteristic that arises when in one of the two brake circuits the hydraulic pressure is initially raised or lowered by a preliminary pressure stage, and then the setting of the respective brake pressure characteristics occurs staggered in time in predefined pressure stages (which are greater than the preliminary pressure stage).

In the second embodiment shown in FIG. 4, at a point of time t0 starting from an initial value p0 in the first brake circuit I the brake pressure p-circuit-1 is raised by a preliminary pressure stage delta-p/2 to a value p1, which has been reached at a point of time t1, wherein the difference of the points of time t1, t0 corresponds to a preliminary time stage delta-t/2. As soon as the brake pressure p-circuit-1 has reached the value p1 at the point of time t1, it is held constant up to a point of time t3 for the duration of a time stage delta-t. In this case, the time stage delta-t corresponds to the difference of the points of time t3, t1 or to two times the preliminary time stage delta-t12. At the point of time t3 the brake pressure p-circuit-1 up to a point of time t5 is raised by a pressure stage delta-p to a value p3, wherein the difference of the points of time t5, t3 corresponds to the time stage delta-t and the pressure stage delta-p corresponds to two times the preliminary pressure stage delta-p/2. The brake pressure p-circuit-1 is then held constant at the value p3 up to a point of time t7, wherein the difference of the points of time t7, t5 again corresponds to the time stage delta-t.

In parallel thereto, in the second brake circuit II the brake pressure p-circuit-2 starting from the point of time t0 is held constant at the initial value p0 for the duration of the preliminary time stage delta-t/2, is raised at the point of time t1 by the pressure stage delta-t to the value p2, which has been reached at the point of time t3, wherein the difference of the points of time t3, t1 corresponds to the duration of the time stage delta-t. From the point of time t3 the brake pressure p-circuit-2 is held constant for the duration of the time stage delta-t up to the point of time t5.

By continuing this interaction between the brake circuits I, II from the points of time t7, t5 in the brake circuits I, II, respectively, the brake pressure characteristics p-circuit-1, p-circuit-2 arise, which are represented in FIG. 4 and from which the brake pressure characteristic p-total that is decisive for the vehicle behaviour results.

Whereas with the procedure according to FIG. 3 the characteristic of the brake pressures p-circuit-1, p-circuit-2 is staggered only in terms of time by a time stage delta-p relative to one another, the characteristics of the brake pressures p-circuit-1, p-circuit-2 with the procedure according to FIG. 4 are staggered both in terms of time by a time stage delta-t/2 and in terms of value by a pressure stage delta-p/2 relative to one another, so that the brake pressure characteristic p-total that is decisive for the vehicle behaviour is notable for a characteristic that is smoothed to an even greater extent.

In any case, irrespective of whether the embodiment according to FIG. 3 or 4 is used, the gradient of the brake pressure characteristic p-total that is decisive for the vehicle behaviour during the braking operation may be varied within a wide range by suitably adapting the pressure stages delta-p and delta-p/2 and/or the time stages delta-t and delta/2.

It is also self-evident to the person skilled in the art that the raising according to the invention of the brake pressures p-circuit-1, p-circuit-2 that is represented by way of the embodiments FIGS. 3 and 4 may equally be used for the reducing of the brake pressures [sic].

In accordance with the provisions of other patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A hydraulic brake system for a land vehicle, comprising:
   a master cylinder, which is actuable by the driver by means of a pedal by one of directly and via a brake booster disposed downstream of the pedal, for generating brake pressures in a first brake circuit and in a second brake circuit, each of which first and second brake circuits comprises at least two wheel brakes and contains hydraulic brake fluid,
   an electronic control unit,
   a hydraulic connection between the master cylinder and the wheel brakes that includes valve arrangements, the valve arrangements connected to the electronic control unit and operable to control one of the establishment and blocking of the hydraulic connection in dependence upon trigger signals from the electronic control unit in order to implement one of normal braking operations brought about directly by the driver and braking operations influenced by the electronic control unit in dependence upon measured variables, which are supplied to the electronic control unit and reflect the vehicle behaviour and the driver request, in that the brake pressure characteristic in the wheel brakes is varied by activating the valve arrangements associated therewith, characterized in that
   the electronic control unit is devised and programmed to set a brake pressure characteristic required for a specific vehicle behaviour by supplying trigger signals, by means of which:

starting from an initial brake pressure value at an initial point of time, a pressure increase phase is implemented in the first brake unit, during which the brake pressure in the first brake circuit rises during a first time increment by a pressure increment to a first increased brake pressure value, after attainment of the first increased brake pressure value, a pressure keeping phase is implemented in the first brake unit, during which the brake pressure in the first brake circuit is held substantially constant for the duration of a second time increment, in parallel to the raising of the brake pressure in the first brake circuit by a pressure increment to the first increased brake pressure value, a pressure keeping phase is implemented in the second brake unit, during which the brake pressure in the second brake circuit from the initial point of time for the duration of the first time increment remains substantially constant at the initial brake pressure value, then, beginning at the end of the first time increment, a pressure increase phase is implemented in the second brake unit, during which the brake pressure in the second brake circuit rises during the second time increment by a pressure increment to a second increased brake pressure value, and the electronic control unit is devised and programmed to alternatingly implement the pressure increase and pressure keeping phases between the two brake circuits continuously from the end of the second time increment so as to generate a linearly-shaped brake pressure characteristic and thereby perform a smooth brake application.

2. The hydraulic brake system according to claim 1, wherein a pump, which is actuable by the electronic control unit by means of a trigger signal, is provided for both raising and lowering the brake pressure in the wheel brakes.

3. The hydraulic brake system according to claim 2, wherein the pump varies its delivery rate in dependence upon the trigger signal of the electronic control unit.

4. The hydraulic brake system according to claim 2, wherein each of the brake circuits includes a pump for both raising and lowering the brake pressure in each of the first and second brake circuits and further wherein an electric motor actuates the pumps of both brake circuits simultaneously.

5. The hydraulic brake system according to claim 1, wherein
the electronic control unit is devised and programmed to set a brake pressure characteristic by supplying trigger signals, by means of which
starting from an initial brake pressure value at an initial point of time in the second brake circuit the brake pressure drops during a first time increment by a pressure increment to a first reduced brake pressure value and
after attainment of the first reduced brake pressure value, the brake pressure in the second brake circuit remains substantially constant for the duration of second time increment.

6. The hydraulic brake system according to claim 5, wherein
the electronic control unit is devised and programmed to set a brake pressure characteristic by supplying trigger signals, by means of which
in parallel to the dropping of the brake pressure in the second brake circuit by a pressure increment to the first reduced brake pressure value, the brake pressure in the first brake circuit from the initial point of time remains substantially constant at the initial value for the duration of the first time increment,
then, beginning at the end of the first time increment, the brake pressure in the first brake circuit drops during the second time increment by a pressure increment to a second reduced brake pressure value.

7. The hydraulic brake system according to claim 6 wherein
the electronic control unit is devised and to alternate pressure reduction and pressure keeping phases between the two brake circuits continuously from the end of the second time increment.

8. The hydraulic brake system according to claim 1, wherein
the electronic control unit is devised and programmed to set a brake pressure characteristic by supplying trigger signals, by means of which
starting from an initial brake pressure value at a first point of time the brake pressure in the first brake circuit rises during a preliminary time increment by a preliminary pressure increment to a first increased brake pressure value, which has been reached at the end of the preliminary time increment, and
after attainment the first increased brake pressure value, the brake pressure in the first brake circuit remains substantially constant for the duration of a first non-preliminary time increment.

9. The hydraulic brake system according to claim 8, wherein
the first non-preliminary time increment lasts a multiple of two times the preliminary time increment.

10. The hydraulic brake system according to claim 9 wherein
the electronic control unit is devised and programmed to set a brake pressure characteristic by supplying trigger signals, by means of which
beginning at the end of the first non-preliminary time increment, the brake pressure in the first brake circuit rises during a second non-preliminary time increment by a pressure increment to a second increased brake pressure value, wherein the duration of the second non-preliminary time increment corresponds substantially to the duration of the first non-preliminary time increment and the pressure increment corresponds substantially to a multiple of two times the preliminary pressure increment.

11. The hydraulic brake system according to claim 10, wherein
the electronic control unit is devised and programmed to set a brake pressure characteristic by supplying trigger signals, by means of which
in parallel to the raising of the brake pressure in the first brake circuit by the preliminary pressure increment to the first increased brake pressure value and the keeping of the brake pressure in the first brake circuit substantially constant for the duration of the first non-preliminary time increment
the brake pressure in the second brake circuit from the initial point of time remains substantially constant at the initial brake pressure value for the duration of the preliminary time increment,
at the end of the preliminary time increment, the brake pressure in the second brake circuit rises during the first non-preliminary time increment by the pressure stage increment to an intermediate pressure value, which is between the first and second increased pressure values and which has been reached at the end of the first non-preliminary time increment, and from the point of time at the end of the first non-preliminary time increment, the brake pressure in the second brake circuit remains substantially constant for the duration of the second non-preliminary time increment.

12. The hydraulic brake system according to claim 11, wherein the electronic control unit is devised and programmed to alternate pressure build-up and pressure keeping phases between the two brake circuits continuously from the end of the second non-preliminary time increment.

13. The hydraulic brake system according to claim 1, wherein the electronic control unit is devised and programmed to set a brake pressure characteristic by supplying trigger signals, by means of which starting from an initial brake pressure value at an initial point of time in the second brake circuit the brake pressure drops during a preliminary time increment by a preliminary pressure increment to a first reduced brake pressure value, which has been reached at the end of the preliminary time increment, and after attainment the first reduced brake pressure, the brake pressure in the second brake circuit remains substantially constant for the duration of a first non-preliminary time increment.

14. The hydraulic brake system according to claim 13, wherein the first non-preliminary time increment lasts a multiple of two times the preliminary time increment.

15. The hydraulic brake system according to claim 14 wherein the electronic control unit is devised and programmed to set a brake pressure characteristic by supplying trigger signals, by means of which from the end of the first non-preliminary time increment, the brake pressure in the second brake circuit drops by a pressure increment to a second reduced brake pressure value, wherein the duration of the second non-preliminary time increment corresponds substantially to the duration of the first non-preliminary time increment and the pressure increment corresponds substantially to a multiple of two times the preliminary pressure increment.

16. The hydraulic brake system according to claim 15, wherein the electronic control unit is devised and programmed to set a brake pressure characteristic by supplying trigger signals, by means of which in parallel to the dropping of the brake pressure in the second brake circuit by the preliminary pressure increment to the first reduced brake pressure value and the keeping of the pressure in the second brake circuit substantially constant for the duration of the first non-preliminary time increment, the brake pressure in the first brake circuit from the initial point of time remains substantially constant at the initial brake pressure value for the duration of the preliminary time increment, at the end of the preliminary time increment, the brake pressure in the first brake circuit drops during the first non-preliminary time increment by the pressure increment to an intermediate pressure value, which is between the first and second reduced pressure values and which has been reached at the end of the first non-preliminary time interval, and from the point of time at the end of the first non-preliminary time increment, the brake pressure in the first brake circuit remains substantially constant for the duration of the second non-preliminary time increment.

17. The hydraulic brake system according to claim 16, wherein the electronic control unit is devised and programmed to alternate pressure reduction and pressure keeping phases between the two brake circuits continuously from the end of the second non-preliminary time increment.

18. The hydraulic brake system according to claim 1 wherein the first and second increased brake pressure values are substantially the same, and the first and second time intervals are substantially the same.

19. The hydraulic brake system according to claim 7 wherein the first and second reduced brake pressure values are substantially the same, and the first and second time intervals are substantially the same.

20. A hydraulic brake system for a land vehicle comprising:

a master cylinder that supplies pressurized hydraulic brake fluid through a hydraulic connection to both a first brake circuit and a second brake circuit, wherein the hydraulic connection includes valve arrangements, and wherein each of the first and second brake circuits includes at least two wheel brakes;

an electronic control unit that is operable to control the valve arrangements to selectively establish and block the hydraulic connection in order to implement either normal braking operations effected directly by a driver or braking operations influenced by the electronic control unit in dependence upon measured variables supplied to the electronic control unit and reflecting the vehicle behaviour and a driver request, the electronic control unit being devised and programmed to set a brake pressure characteristic required for a specific vehicle behaviour by supplying trigger signals such that:

(1) during a first time increment, both (a) a pressure increasing phase is implemented in the first brake unit in which the brake pressure in the first brake circuit rises from an initial brake pressure value to a first increased brake pressure value, and simultaneously (b) a pressure keeping phase is implemented in the second brake unit in which the brake pressure in the second brake circuit remains substantially constant at the initial brake pressure value; and (2) during a second time increment at the conclusion of the first time increment, a pressure keeping phase is implemented in the first brake unit in which the brake pressure in the first brake circuit is held substantially constant, and a pressure increasing phase is implemented in the second brake unit in which the brake pressure in the second brake circuit rises to a second increased brake pressure value; wherein the electronic control unit is devised and programmed to alternatingly implement the pressure increasing and pressure keeping phases between the two brake circuits continuously from the end of the second time increment so as to generate a linearly-shaped brake pressure characteristic and thereby perform a smooth brake application.

\* \* \* \* \*

UNITED STATES PATENT AND TRADEMARK OFFICE
CERTIFICATE OF CORRECTION

| | | |
|---|---|---|
| PATENT NO. | : 10,166,957 B2 | Page 1 of 1 |
| APPLICATION NO. | : 11/921609 | |
| DATED | : January 1, 2019 | |
| INVENTOR(S) | : Thomas Bach et al. | |

It is certified that error appears in the above-identified patent and that said Letters Patent is hereby corrected as shown below:

In the Claims

Column 9, Claim 1, Line 30, delete "so as".

Column 13, Claim 20, Line 1, delete "so as".

Signed and Sealed this
Nineteenth Day of February, 2019

Andrei Iancu
*Director of the United States Patent and Trademark Office*